(12) United States Patent
Pruitt et al.

(10) Patent No.: US 7,726,108 B1
(45) Date of Patent: Jun. 1, 2010

(54) WIDE CUT ROTARY HARVESTER HAVING CUT CROP FEEDER MECHANISM

(75) Inventors: Martin E. Pruitt, Hesston, KS (US); Brendon Nafziger, Canton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/353,831

(22) Filed: Jan. 14, 2009

(51) Int. Cl.
*A01D 34/00* (2006.01)
(52) U.S. Cl. .............................. 56/14.5; 56/6
(58) Field of Classification Search ................ 56/14.5, 56/14.4, 14.3, 124, 6, 119, 192
See application file for complete search history.

(56) References Cited

U.S. PATENT DOCUMENTS

| | | | |
|---|---|---|---|
| 2,319,292 A | 5/1943 | Boggs | |
| 2,523,014 A | 9/1950 | Gooch | |
| 2,698,170 A | 12/1954 | Foley | |
| 2,765,611 A | 10/1956 | King | |
| 2,777,272 A | 1/1957 | Smith et al. | |
| 2,906,077 A | 9/1959 | Hale et al. | |
| 2,992,466 A | 7/1961 | Gallagher | |
| 3,014,324 A | 12/1961 | McCarty | |
| 3,027,701 A | 4/1962 | Campbell | |
| 3,118,265 A * | 1/1964 | Shaver | 56/14.4 |
| 3,306,015 A | 2/1967 | Myers | |
| 3,388,538 A | 6/1968 | Markham | |
| 3,412,535 A * | 11/1968 | Drummond | 56/14.4 |
| 3,673,779 A | 7/1972 | Scarnato et al. | |
| 3,774,380 A | 11/1973 | Ancellin | |
| 3,803,820 A | 4/1974 | Knapp | |
| 3,857,225 A | 12/1974 | Knudson | |
| 3,999,359 A | 12/1976 | Jordan et al. | |
| 4,126,989 A | 11/1978 | Oosterling et al. | |
| 4,147,016 A | 4/1979 | Jensen et al. | |
| 4,166,350 A | 9/1979 | Werner | |
| 4,185,445 A | 1/1980 | van der Lely | |
| 4,187,664 A | 2/1980 | Meek et al. | |
| 4,244,163 A | 1/1981 | Gantzer | |
| 4,253,294 A | 3/1981 | Zweegers | |
| 4,283,905 A | 8/1981 | van der Lely | |
| 4,330,982 A | 5/1982 | Vissers et al. | |
| 4,476,666 A | 10/1984 | van der Lely et al. | |
| 4,487,003 A | 12/1984 | Mathews et al. | |
| 4,525,987 A | 7/1985 | Werner et al. | |

(Continued)

FOREIGN PATENT DOCUMENTS

CA 2166671 C 4/1997

(Continued)

OTHER PUBLICATIONS

Brochure; KRONE AM Disc Mowers, coded VDV 10-3.88.

(Continued)

*Primary Examiner*—Árpád Fábián-Kovács
(74) *Attorney, Agent, or Firm*—Hovey Williams LLP (57) ABSTRACT

A wide-cut harvester having a rotary cutter bed that takes a wider cut than the opening to the conditioner rolls of the machine employs a pair of stub augers at opposite corners of the opening to assist in directing cut crop material into the opening for treatment by the conditioner rolls.

9 Claims, 7 Drawing Sheets

U.S. PATENT DOCUMENTS

| | | | | |
|---|---|---|---|---|
| 4,531,349 | A | 7/1985 | Ehrhart et al. | |
| 4,567,716 | A | 2/1986 | Makofka et al. | |
| 4,637,201 | A | 1/1987 | Pruitt et al. | |
| 4,693,062 | A | 9/1987 | van der Lely et al. | |
| 4,703,612 | A | 11/1987 | Webster | |
| 4,719,742 | A | 1/1988 | Ermacora et al. | |
| 4,759,172 | A | 7/1988 | Purrer et al. | |
| 4,809,488 | A | 3/1989 | Neuerburg et al. | |
| 4,838,013 | A | 6/1989 | Louet Feisser et al. | |
| 4,843,804 | A | 7/1989 | Wellman | |
| 4,858,418 | A | 8/1989 | von Allwoerden | |
| 4,860,527 | A | 8/1989 | Maarten | |
| 4,879,870 | A | 11/1989 | Neuerburg | |
| 4,896,491 | A | 1/1990 | Warnsholz et al. | |
| 4,899,523 | A | 2/1990 | Frumholtz et al. | |
| 4,901,510 | A | 2/1990 | McClure et al. | |
| 4,909,023 | A | 3/1990 | Haberkorn et al. | |
| 4,986,061 | A | 1/1991 | Frumholtz et al. | |
| 4,986,064 | A | 1/1991 | Ermacora | |
| 5,012,635 | A | 5/1991 | Walters et al. | |
| 5,060,462 | A | 10/1991 | Helfer et al. | |
| 5,086,613 | A | 2/1992 | Fox et al. | |
| 5,094,063 | A | 3/1992 | Wattron et al. | |
| 5,143,137 | A | 9/1992 | West | |
| 5,148,580 | A | 9/1992 | Dyckow | |
| 5,172,539 | A | 12/1992 | Jennnings et al. | |
| 5,179,822 | A | 1/1993 | McLean | |
| 5,272,859 | A | 12/1993 | Pruitt et al. | |
| 5,279,100 | A | 1/1994 | Pruitt et al. | |
| 5,337,544 | A | 8/1994 | Lauritsen | |
| 5,345,752 | A | 9/1994 | Pruitt et al. | |
| 5,421,145 | A | 6/1995 | Pruitt et al. | |
| 5,430,997 | A | 7/1995 | O'Halloran et al. | |
| 5,433,064 | A | 7/1995 | Schmitt et al. | |
| 5,463,852 | A | 11/1995 | O'Halloran et al. | |
| 5,471,825 | A | 12/1995 | Panoushek et al. | |
| 5,519,989 | A | 5/1996 | Shelbourne et al. | |
| 5,566,535 | A | 10/1996 | Pruitt | |
| 5,768,865 | A | 6/1998 | Rosenbalm et al. | |
| 5,778,644 | A * | 7/1998 | Keller et al. | 56/11.2 |
| 5,842,330 | A | 12/1998 | Richardson et al. | |
| 6,029,434 | A | 2/2000 | Ratzlaff | |
| 6,047,532 | A | 4/2000 | O'Halloran et al. | |
| 6,058,688 | A * | 5/2000 | Krambeck et al. | 56/14.5 |
| 6,158,201 | A * | 12/2000 | Pruitt et al. | 56/6 |
| 6,279,304 | B1 * | 8/2001 | Anstey et al. | 56/341 |
| 6,520,378 | B1 | 2/2003 | Goettner et al. | |
| 6,564,535 | B1 | 5/2003 | Nafziger | |
| 6,581,362 | B2 | 6/2003 | Rosenbalm et al. | |
| 6,679,042 | B1 * | 1/2004 | Schrag et al. | 56/341 |
| 6,718,743 | B2 * | 4/2004 | Rosenbalm et al. | 56/6 |
| 6,718,744 | B2 | 4/2004 | Rosenbalm et al. | |
| 7,036,296 | B2 * | 5/2006 | Wubbels | 56/10.8 |
| 7,165,381 | B2 | 1/2007 | Rosenbalm et al. | |
| 7,204,074 | B2 * | 4/2007 | Bandstra et al. | 56/341 |
| 7,340,876 | B1 | 3/2008 | Barnett | |
| 7,356,982 | B2 | 4/2008 | Barnett | |
| 7,454,888 | B2 | 11/2008 | Barnett | |
| 2007/0204587 | A1 * | 9/2007 | Rosenbalm et al. | 56/119 |
| 2008/0016837 | A1 * | 1/2008 | Rosenbalm et al. | 56/192 |
| 2008/0066439 | A1 * | 3/2008 | Barnett | 56/7 |
| 2008/0256920 | A1 | 10/2008 | Yanke | |
| 2009/0071116 | A1 | 3/2009 | Barnett | |

FOREIGN PATENT DOCUMENTS

| | | |
|---|---|---|
| DE | 3224170 A1 | 12/1983 |
| DE | 3224851 A1 | 1/1985 |
| DE | 3501133 A1 | 7/1986 |
| EP | 0116661 A1 | 5/1979 |
| EP | 0 116 661 B1 | 8/1984 |
| EP | 0277343 B1 | 12/1987 |
| EP | 0 358 045 A1 | 3/1990 |
| EP | 0358045 B1 | 3/1990 |
| EP | 0524668 A2 | 5/1992 |

OTHER PUBLICATIONS

Brochure; KRONE High Performance Disc Mower AMG 282, coded Nie 20-5.88.

Brochure; Deutz-Fahr Rotary Mowers, Coded 9147810 Printed in West Germany 8708.

Brochure; KRONE Die Krone-Frontescheibenmäher AFL242 Z Und 282.Z; AFL 243 RS und RS, Coded Nie AFL 20-11.93.

Brochure; Niemeyer, Forage Harvesting with Niemeyer—1992, Coded Fu N02/92G-90363.

New Holland Brochure (1998) 33034011 39840 VPC entitled "New Model HW340 Self-Propelled Discbine Disc Mower-Conditioner" (4 pgs).

* cited by examiner

WIDE CUT ROTARY HARVESTER HAVING CUT CROP FEEDER MECHANISM

TECHNICAL FIELD

The present invention relates to crop harvesting machines of the type that use rotary cutters to sever standing crops from the field and then condition the cut crop between one or more sets of conditioning rolls before depositing the crop back onto the ground in the form of a windrow or swath. More particularly, it relates to wide cut machines in which the cutting width is significantly greater than the width of a central opening leading to the conditioning rolls such that crop materials cut outboard of the opening must be somehow moved inwardly from the outboard cutters after severance before turning rearwardly through the opening and into the conditioner rolls.

BACKGROUND AND SUMMARY

Wide cut rotary harvesters present inherent challenges in getting outboard severed crop materials to flow smoothly and without hesitation in a lateral direction toward the center of the machine before then turning rearwardly and moving through the central discharge opening into the conditioner rolls. Any hesitation on the part of the crop materials as they "turn the corner" and move rearwardly into the conditioner rolls can cause a number of significant problems, both in the quality of the finished windrows and the quality of cutoff being achieved by the rotary cutters. Due to the increased speeds at which rotary harvesters can travel compared to that of sickle-type machines, cutoff, feeding and control problems are exacerbated in rotary machines due to the dramatically increased volume of cut material flowing through the machines.

It is desirable for many reasons to avoid the use of a large center-gathering auger behind the rotary cutters for achieving the center-feeding function. Without such augers, however, the outboard rotary cutters themselves, sometimes together with upstanding cage-like impellers and other devices, must carry out not only the cutting function but also the lateral conveying function of the crop.

In one preferred rotary cutter bed design, a group of inboard cutters of the bed are arranged with their axes of rotation directly in front of the opening to the conditioner rolls, inboard of conditioning structure on the rolls. At least one, and preferably two, additional outboard cutters are provided at each end of the bed and have their axes of rotation located outboard of the opening and the conditioning structure. The outboard cutters both rotate in the same direction, with their front extremities moving generally inwardly toward the center of the machine to convey outboard cut materials toward the inboard cutters. Most of the cutters of the inboard group are arranged in oppositely rotating pairs with other cutters of the group such that cut crop materials from the paired cutters in the inboard group are directed straight back into the conditioner rolls in a number of streams. However, the two opposite end cutters in the inboard group are each paired up with the next adjacent oppositely rotating outboard cutter, rather than another inboard cutter within the group. Consequently, it is possible that, in some situations, some or all of the crop streams from those "mixed" pairs, where one is an inboard cutter and one is an outboard cutter, may land laterally outwardly beyond the opening, missing the conditioner rolls completely and ending up against wall structure behind the outboard cutters.

This undesirable condition seems most likely to occur if the end cutters of the inboard group are so situated that their cutting knives project outboard of conditioning structure on the conditioning rolls as the knives are moving rearwardly in their paths of travel. It also seems to be the most pronounced when only a partial cut is being taken by the harvester wherein the outboard cutters at one end of the bed are presented with no standing crop material to sever. Cut materials that find their way behind outboard cutters tend to collect in that area and ultimately work their way forward, impeding proper cutoff and otherwise interfering with proper flow into the conditioner rolls. Sometimes, the accumulating material may even shoot out the ends of the cutter bed, rather than flowing to the center and being processed by the conditioner rolls.

The present invention involves a way of making the corner regions of the opening to the conditioner rolls "live" or "active" so as to encourage the smooth, orderly flow of crop materials into the conditioner rolls at those critical areas. In one preferred embodiment, this is accomplished through the use of relatively short, small, horizontally oriented stub augers immediately behind and between the axes of rotation of the end inboard cutters and the next adjacent outboard cutters. Preferably, such stub augers to do not extend laterally outwardly beyond the first outboard cutters, and they overhang the rear extremities of such cutters at a level slightly above the cutting plane so as to help strip materials from the cutters that might otherwise tend to carry around the cutters. Inboard ends of the stub augers preferably project inwardly beyond the corresponding outboard ends of conditioning structure on the conditioner rolls, and the augers are preferably at substantially the same level vertically as the closest lower conditioner roll in the set of conditioner rolls.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
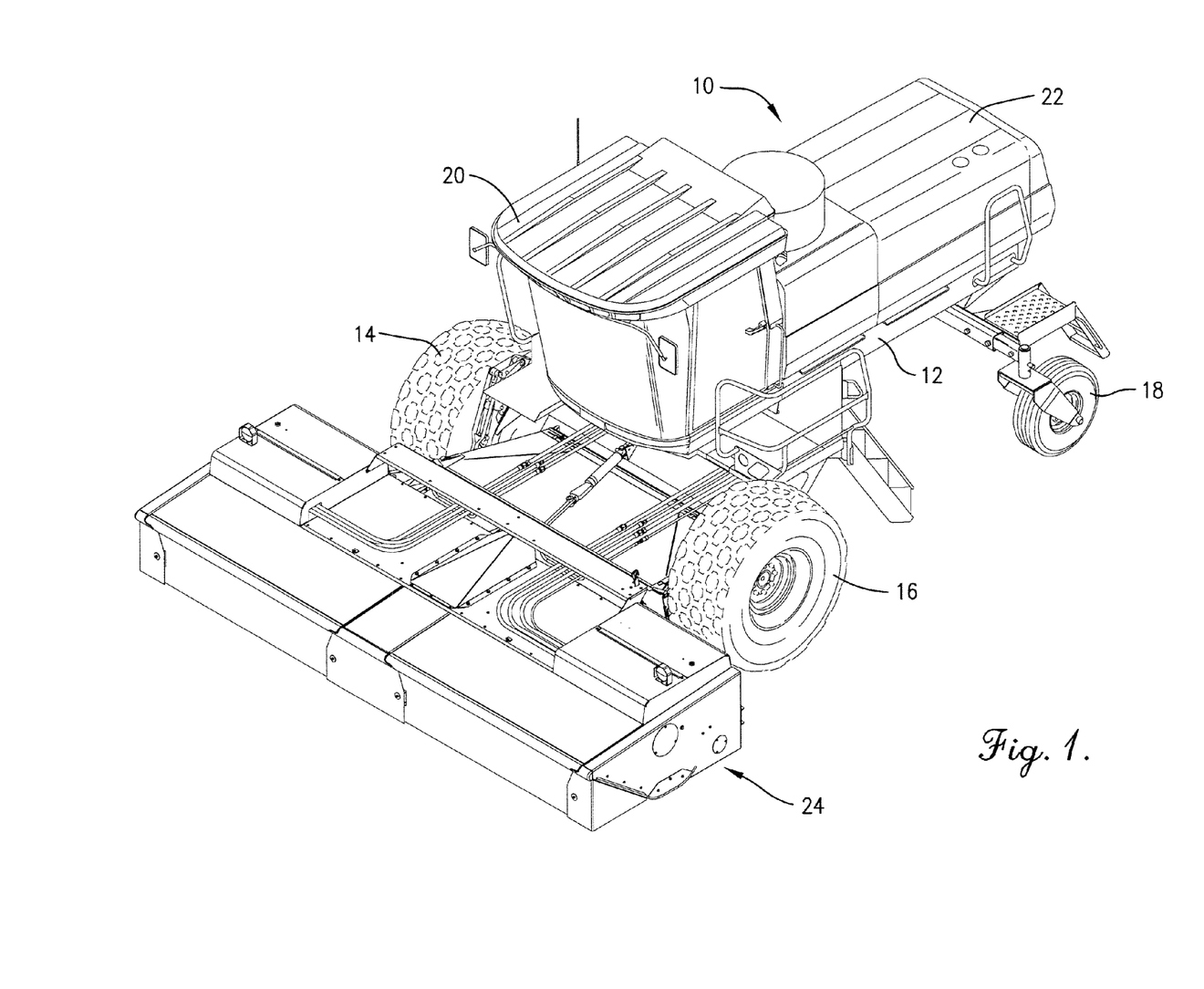
FIG. 1 is a left front perspective view of a self-propelled windrower exemplifying one type of harvesting machine that may employ a rotary cutter header in accordance with the principles of the present invention.

Referring initially to FIG. 1, the harvester selected for illustration in that figure comprises a self-propelled windrower 10 operable to mow and collect standing crop in the field, condition the cut material as it moves through the machine to improve its drying characteristics, and then return the conditioned material to the field in a windrow or swath. Windrower 10 includes a chassis or frame 12 supported by a pair of front drive wheels 14, 16 and a pair of rear caster wheels 18 (only the left rear caster wheel 18 being illustrated) for movement across a field to be harvested. Frame 12 carries a cab 20, within which an operator controls operation of windrower 10, and a rearwardly spaced compartment 22 that houses a power source (not shown) such as an internal combustion engine. A harvesting header 24 is supported on the front of frame 12 in a manner well understood by those skilled in the art.

With reference to the remaining figures, header 24 includes a rotary cutter bed 26 across the front of the machine that serves as the means by which standing crops are severed as the windrower advances across a field. In the illustrated embodiment, cutter bed 26 includes a series of ten rotary cutters 28 extending across the path of travel of the machine, each cutter 28 being rotatable about its own upright axis. A larger or smaller number of cutters could be provided. For the sake of convenience, the ten cutters 28 are denoted by the numerals 28a-28j, beginning with the leftmost cutter 28 as viewed from the rear of the machine.

In the illustrated embodiment, header 24 has a centrally disposed discharge opening 27 behind cutter bed 26 that is shorter than bed 26 and which serves as an inlet to a set of conditioner rolls 29. In some embodiments of the invention, the discharge opening 27 might not be disposed centrally. The axes of rotation of cutters 28c-28h are all disposed inboard of the lateral limits of opening 27 and inboard of conditioning structure on rolls 29 such that those cutters may be described as a group of "inboard" cutters. On the other hand, the axes of rotation of cutters 28a, 28b and 28i, 28j are all disposed outboard of the lateral limits of opening 27 and outboard of conditioning structure on rolls 29 such that those cutters may be described as "outboard" cutters. While the illustrated embodiment has two sets of outboard cutters, other embodiments may utilize only a single set of outboard cutters, or more than two sets.

Cutters 28b-28i are arranged in four oppositely rotating pairs consisting of the pair 28b, 28c; the pair 28d, 28e; the pair 28f, 28g; and the pair 28h, 28i. One cutter of each pair rotates in a clockwise direction viewing FIG. 2, and the other rotates in a counterclockwise direction viewing that same figure. Thus, using the paired cutters 28b and 28c as an example, cutter 28b rotates in a clockwise direction while 28c rotates in a counterclockwise direction. While paired cutters 28d, 28e and 28f, 28g of the inboard group cooperate with other inboard cutters, the two end cutters 28c and 28h in the group cooperate with outboard cutters 28b and 28i. Thus, each of the first and last pairs of oppositely rotating cutters comprises a "mixed" pair of cooperating cutters consisting of one inboard cutter and one outboard cutter.

Each pair of oppositely rotating cutters sends a stream of severed material rearwardly between them as the machine moves through the field of standing crop. The outermost outboard cutters 28a and 28j rotate in the same direction as the inwardly adjacent outboard cutters 28b and 28i, respectively. Thus, outermost outboard cutter 28a rotates in a clockwise direction viewing FIG. 2, while outermost outboard cutter 28j rotates in a counterclockwise direction viewing that same figure. Consequently, crop material cut by outboard cutters 28a, 28b and 28i, 28j is thrown laterally inwardly across the front of the machine to the overlap region between 28b, 28c and 28h, 28i, where it is swept rearwardly.

Figure 4:
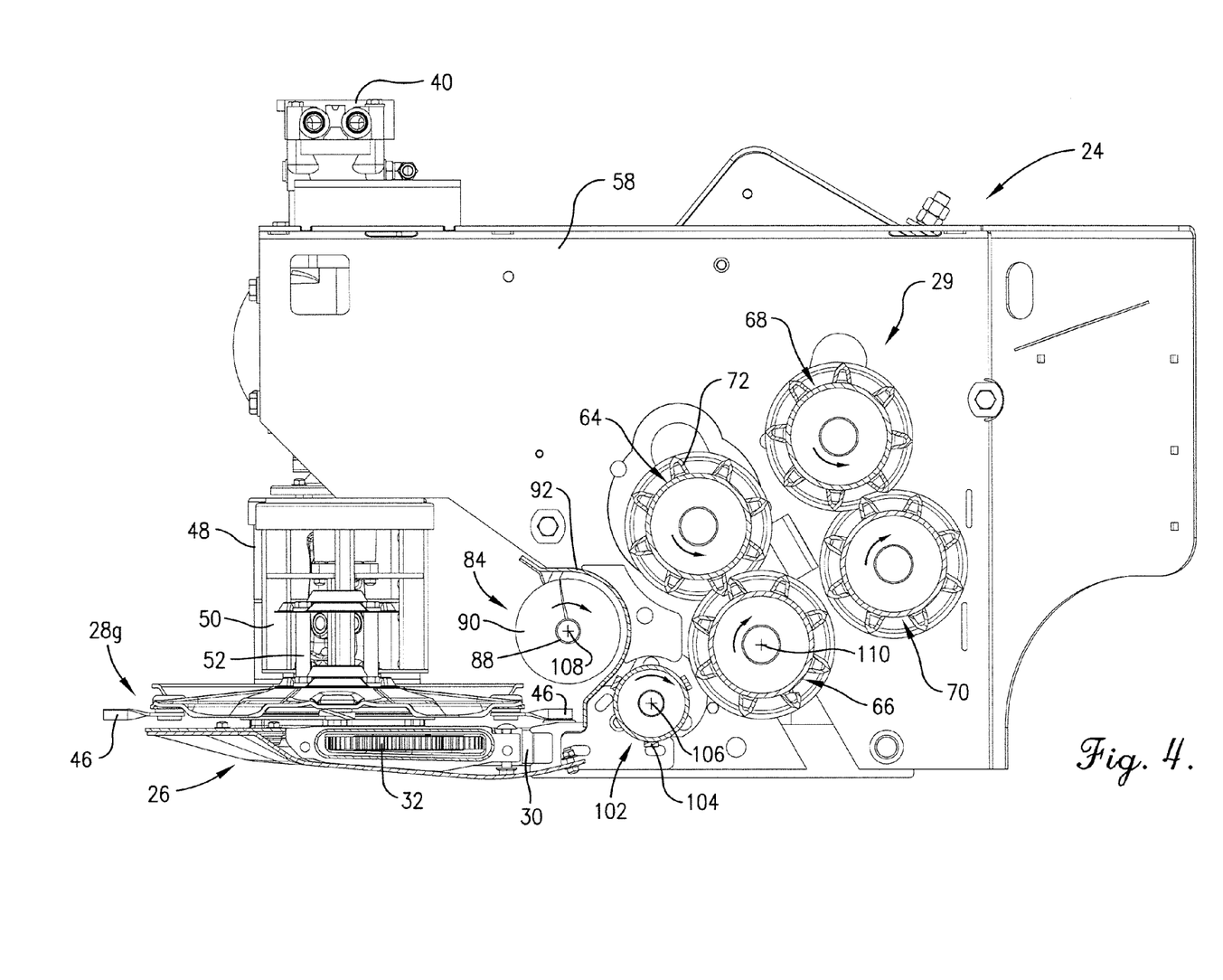
FIG. 4 is an enlarged, transverse cross-sectional view through the header taken substantially along line 4-4 of FIG. 3.

Cutters 28a-28j are rotatably supported on an elongated, flat gear case 30 that extends underneath the cutters for the full effective width of header 24. As illustrated in FIG. 4, gear case 30 is hollow and contains a train of flat spur gears 32 or other mechanism such as shafts and bevel gears or belts and pulleys for drivingly interconnecting cutters 28a-28j. A first hydraulic motor 34 at one end of cutter bed 26 supplies driving power to cutter 28a via a gear box 36 and upright output shaft 38, while a second hydraulic motor 40 at the opposite end of cutter bed 26 supplies driving power to cutter 28j via a gear box 42 and upright shaft 43. Thus, cutter bed 26 is driven by both hydraulic motors 34, 40 cooperatively, all of the spur gears 32 being operably interconnected with one another throughout the full length of the cutter bed 26 to assure that cutters 28a-28j remain in synchronized relationship with one another.

Figure 5:
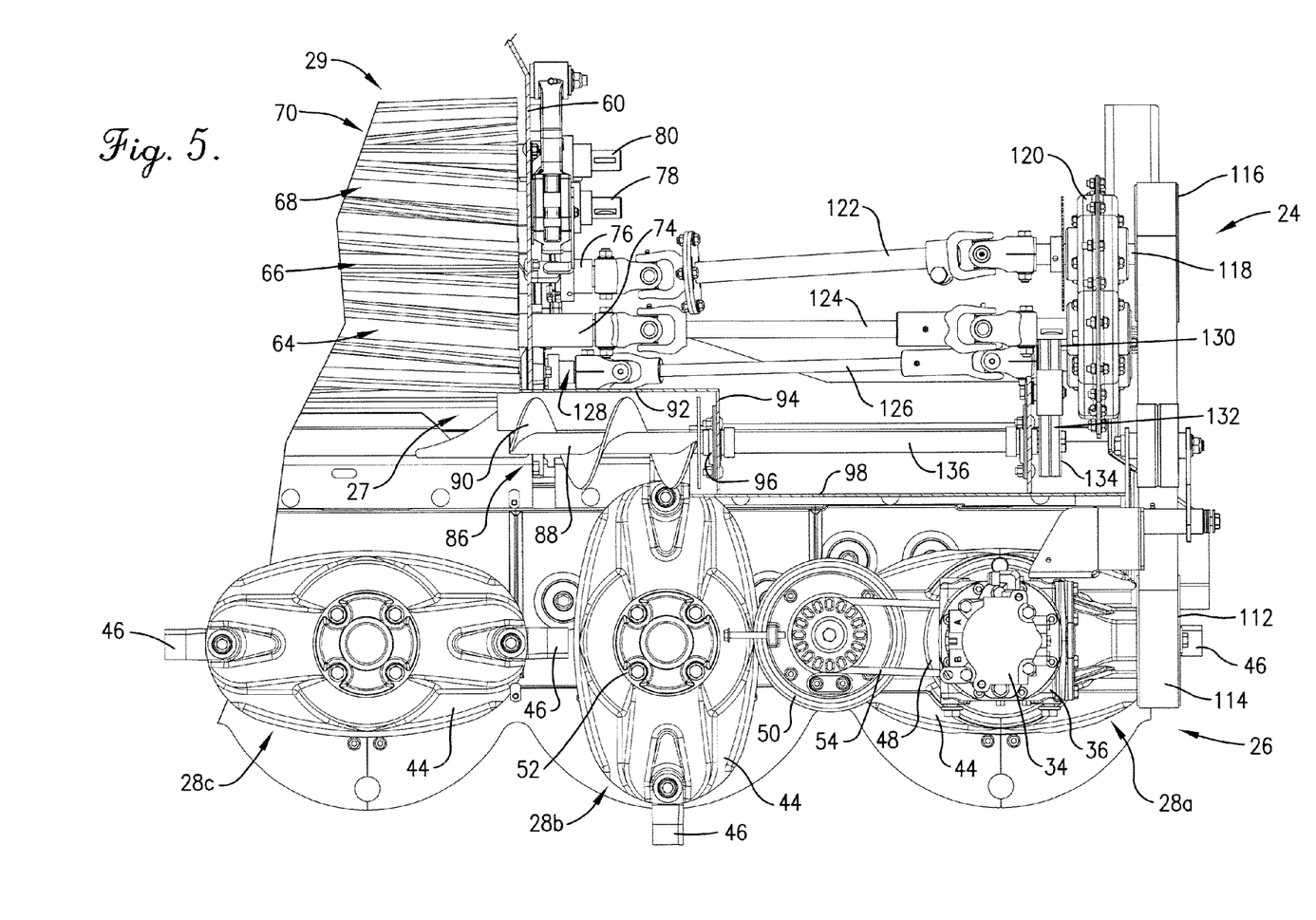
FIG. 5 is an enlarged, fragmentary plan view of the left end portion of the header similar to FIG. 2 but showing additional structure removed and in cross-section to reveal details of construction.

Each of the cutters 28 includes a generally elliptical, formed metal knife carrier 44, such as illustrated by the cutters 28a, 28b and 28c in FIG. 5, and a pair of free-swinging knives 46 at opposite ends of carrier 44 in a well known manner. The circular paths of travel of the knives 46 of adjacent cutters 28 overlap one another.

The outermost outboard cutters 28a and 28j are each provided with upright, generally cylindrical, cage-like impellers 48 fixed to their corresponding carrier 44 for rotation therewith. Impellers 48 help convey cut crop materials laterally inwardly toward the center of the machine. An intermediate, depending, upright, cage-like impeller 50 is located inwardly beside each impeller 48 generally centrally between the axes of rotation of the two outboard cutters 28a, 28b and 28i, 28j.

The impellers 50 are not fixed to any of the cutters, but are instead suspended by overhead structure not shown above the cutting plane of knives 46 for rotation in the same direction as the next adjacent outboard impeller 48. The bottom extremity of each impeller 50 is spaced a short distance above the cutting plane of the knives 46. A short, upstanding, generally cylindrical impeller 52 is fixed to each of the inner outboard cutters 28b, 28i for rotation therewith. The impellers 52 are not only shorter than impellers 48, 50, but are also smaller in diameter. The top extremities of the short impellers 52 are spaced below the level of the outer two impellers 48 and 50. The left intermediate impeller 50 is driven by left drive shaft 38 via a belt and sheave arrangement 54, while the right intermediate impeller 50 is similarly driven by upright shaft 43 via a belt and sheave arrangement 56.

Header 24 is constructed in such a way as to present a pair of upright, laterally spaced apart panels 58 and 60 behind cutter bed 26 that define a crop conditioning region in which the set of conditioning rolls 29 is located. The front extremities of panels 58, 60 cooperate to in part define lateral boundaries of the opening 27. In the illustrated embodiment, the set of rolls 29 includes two pairs of cooperating conditioner rolls, although a single pair or more than two pairs could be utilized without departing from the principles of the present invention. In the illustrated embodiment, the front pair of conditioner rolls includes a upper conditioner roll 64 and a lower conditioner roll 66, while the rear pair of conditioner rolls correspondingly includes a upper roll 68 and a lower roll 70.

Conditioner rolls 64-70 may assume a variety of configurations without departing from the principles of the present invention. For example, the rolls could all be hard, metal rolls, or some could be softer rolls having compressible outer surfaces. While different conditioning actions are achievable with different roll configurations and materials, the particular choice of such configurations and materials is not critical insofar as the present inventive concepts are concerned. In all instances, however, the conditioner rolls will have some kind of conditioning structure on their outermost peripheral surfaces, whether such surfaces are ribbed, grooved or smooth, for example.

In the illustrated embodiment, the conditioning structure on the outer peripheries of the rolls 64-70 comprises metal ribs 72 as illustrated with respect to upper conditioning roll 64. Ribs 72 of upper front roll 64 mesh with ribs 72 of lower front roll 66 while, correspondingly, ribs 72 of upper rear roll 68 mesh with ribs 72 of lower rear roll 70. In the illustrated embodiment, ribs 72 on each of the rolls are arranged in a herringbone pattern around each roll. In this respect, each rib extends generally helically around and along the roll but changes directions at the midpoint of the roll and winds in the opposite direction for the remaining length of the roll. The central apex where the rib changes direction may be pointed or curved as desired. The helical ribs in the illustrated embodiment may take the form of those disclosed and claimed in currently pending application Ser. No. 11/247,806 filed Oct. 11, 2005, titled "Crop Harvester Having Metal Conditioner Rolls With Herringbone Rib Pattern" in the names of Pruitt, et al. and assigned to the assignee of the present invention. The entire specification and drawings of the '806 application is hereby incorporated by reference into the present specification.

Front rolls 64, 66 define a nip therebetween through which severed crop materials pass as they are being conditioned. Likewise, rear conditioner rolls 68, 70 define a nip for receiving crop materials from front rolls 64, 66 and conditioning such materials before projecting them rearwardly for deposit on the ground in the form of a windrow or swath as well understood by those skilled in the art. Upper rolls 64, 68 are biased downwardly toward respective lower rolls 66, 70 by tension means not illustrated so as to maintain a degree of yieldable intermeshing of the rolls depending upon the volume of crop materials passing therebetween. As the volume increases, upper rolls 64, 68 may separate upwardly from their corresponding lower rolls 66, 70 in a well known manner.

Figure 6:
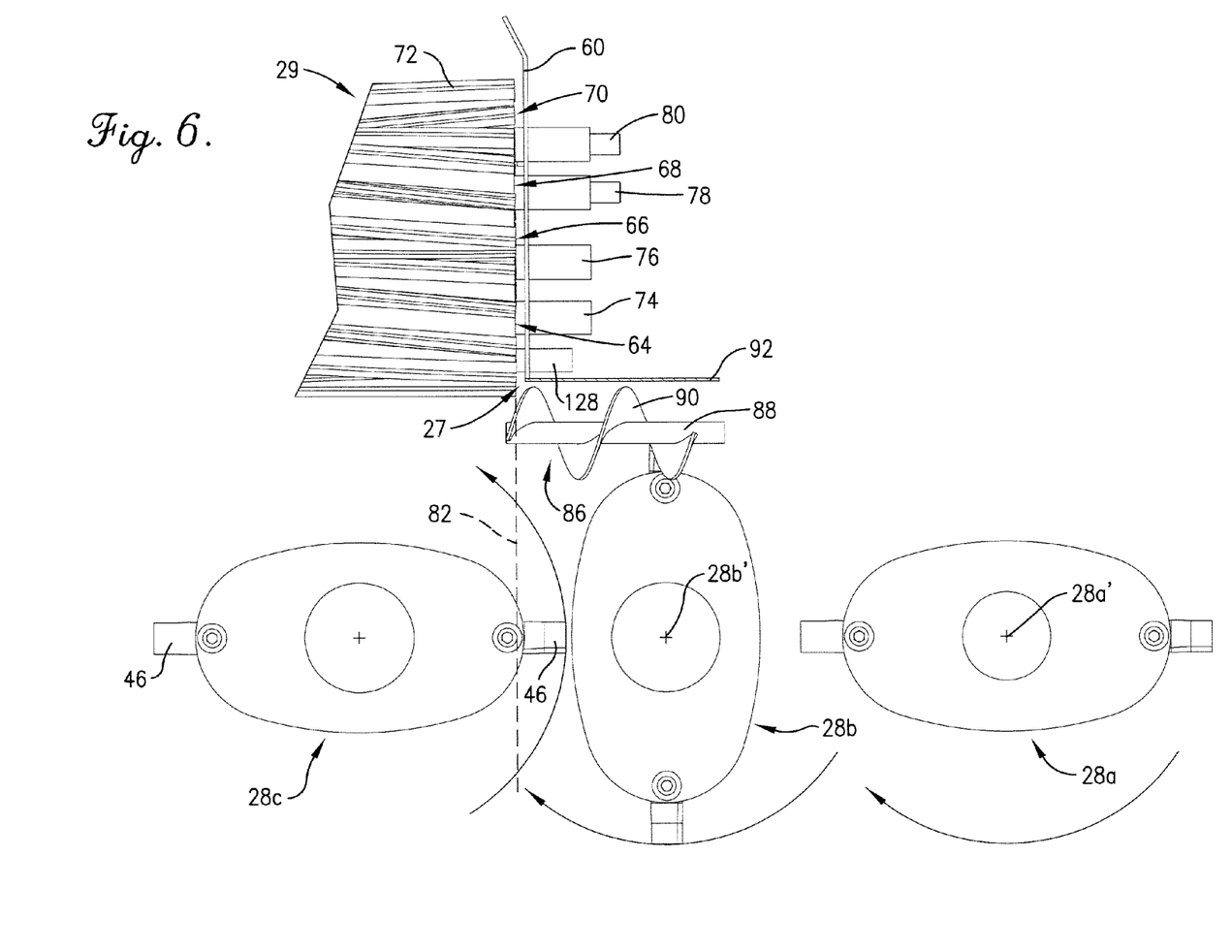
FIG. 6 is a schematic plan illustration of the header similar to FIG. 5 but with additional structures removed to illustrate a problematic circumstance wherein the path of knife travel of the end cutter in the group of inboard cutters overlaps and extends outboard of the conditioning structure on the corresponding end of the conditioner rolls.

Using the left end of rolls 29 as an example in FIG. 6 but bearing in mind that the same relationship exists at the right end, it will be seen that conditioning structure (ribs 72) on each of the conditioning rolls terminates slightly inboard of the proximal end panel 60 of the conditioning region. From that point, each roll continues axially outwardly through and beyond panel 60 in the form of a small diameter shaft, thus presenting shaft 74 of upper front roll 64, shaft 76 of front lower roll 66, shaft 78 of upper rear roll 68, and shaft 80 of lower rear roll 70. An imaginary line 82 projected forwardly from the outboard terminus of the conditioning ribs 72 across cutter bed 26 reveals that knives 46 on cutter 28*c* project outwardly beyond the outboard terminations of the ribs 72 during the time that knives 46 are sweeping rearwardly. Consequently, there is a tendency for some of the cut crop stream traveling rearwardly between cutters 28*b* and 28*c* to be projected laterally outboard of the conditioning ribs 72 on rolls 64-70.

While, theoretically, conditioner rolls 64-70 could be made longer so as to extend the conditioning ribs 72 outwardly beyond the overlap area of cutters 28*b*, 28*c*, there is a generally accepted maximum length in the industry for conditioner rolls in order to avoid certain operating issues. Consequently, in some instances, such as illustrated particularly in FIG. 6, the length of cutter bed 26 relative to the length of the conditioner rolls is such that the path of travel of the knives on an inboard cutter near the outer boundaries of the opening to the conditioner rolls necessarily overlaps and projects outboard of the corresponding end of the conditioning structure on the rolls as the knives of that inboard cutter move rearwardly generally toward the conditioner rolls.

When header 24 takes a full width cut utilizing the entire length of cutter bed 26, the fact that the knives 46 of cutters 28*c* and 28*h* overlap the outboard terminations of conditioning ribs 72 on rolls 64-70 is not a particular problem. However, if a partial cut pass is taken in such a way that the left end of cutter bed 26 is running in previously cut stubble, i.e. outboard cutters 28*a* and 28*b* are not severing new material, crop that is cut by inboard cutter 28*c* tends to be thrown rearwardly but in a diagonally outboard direction outboard of the terminations of conditioning ribs 72. Thus, it does not enter the conditioning region at all and may instead tend to collect at least temporarily behind cutters 28*b* and 28*a*, unless some means is provided for preventing that behavior.

To this end, in accordance with the present invention, header 24 is provided with a pair of relatively short, small stub augers 84 and 86 generally immediately behind cutters 28*b* and 28*i* at the "corners" of the opening 27 to the crop conditioning region. Crop-conveying portions of augers 84 and 86 are thus located generally behind and between the axes of rotation of their respective cutter pairs 28*h*, 28*i* and 28*b*, 28*c*. Preferably, although not necessarily, stub augers 84, 86 are "upturning", such that their front extremities nearest to the line of cutters 28 are rotating upwardly.

Preferably, as illustrated in FIG. 6 with respect to the left end of the machine, each stub auger 84, 86 projects inwardly slightly beyond imaginary line 82 such that the discharge end of the stub auger is slightly inboard of the outboard termination of the conditioning ribs 72 on rolls 64-70. As also seen in FIG. 6 (using auger 86 and cutter 28*c* as an example for both corners of opening 27), the inboard end of auger 86 laterally overlaps and projects inwardly beyond the outermost extent of cutting blades 46 on cutter 28*c* as they move rearwardly in their path of travel. Stated otherwise, cutting blades 46 are so located that they project laterally outwardly beyond the inboard end of auger 86.

Each auger 84, 86 preferably has a relatively small diameter central tube 88 about which a helical flighting 90 winds. The diameter of tube 80 is preferably less than half the diameter of fighting 90 and most preferably on the order of approximately one-fourth the diameter of fighting 90. In the illustrated and preferred embodiment, fighting 90 starts at the most inboard end of tube 88 and extends for two complete revolutions about tube 88, although this is subject to variation depending upon personal preference. In one preferred embodiment, flighting 90 extends from an inboard point slightly inboard of the conditioning ribs 72 to an outboard point at least as far as axis 28W of cutter 28*b*, and preferably between axis 28*b*' of cutter 28*b* and axis 28*a*' of cutter 28*a*.

As illustrated best in FIGS. 4-7, each of the stub augers 84, 86 has associated with it a rear wall 92 of generally concave cross-sectional configuration that is generally concentric with the axis of rotation of the stub auger. Rear wall 92 is closely spaced behind the rear extremity of the stub auger and extends in an inboard direction slightly beyond the inboard end of the stub auger. Thus, the inboard end of each rear wall 92 serves to effectively provide a corresponding outermost limit of the opening 27 down at the level of stub augers 84, 86 and slightly above the cutting plane of cutters 28.

Rear wall 92 extends in an outboard direction to a point slightly beyond the outboard termination of fighting 90 where a fore-and-aft end wall 94 (FIG. 5) is disposed. Fore-and-aft end wall 94 has a bearing assembly 96 that journals tube 88 of auger 84 or 86 for rotation and provides cantilever support for the flighted end of tube 88. Auger tube 88 extends in an outboard direction beyond end wall 94 where it is operably coupled with drive mechanism in a manner as described below. A front curved wall 98 of transversely convex configuration is generally concentric with the axis of each stub auger 84, 86 and serves as a non-active surface behind the outboard cutter 28a or 28j. As illustrated best in FIGS. 2, 3, and 7, an inclined top wall 100 extends upwardly and forwardly from the top extremity of rear wall 92 from a point adjacent the inboard end of rear wall 92 to a point adjacent the outboard end of front wall 98.

Figure 7:
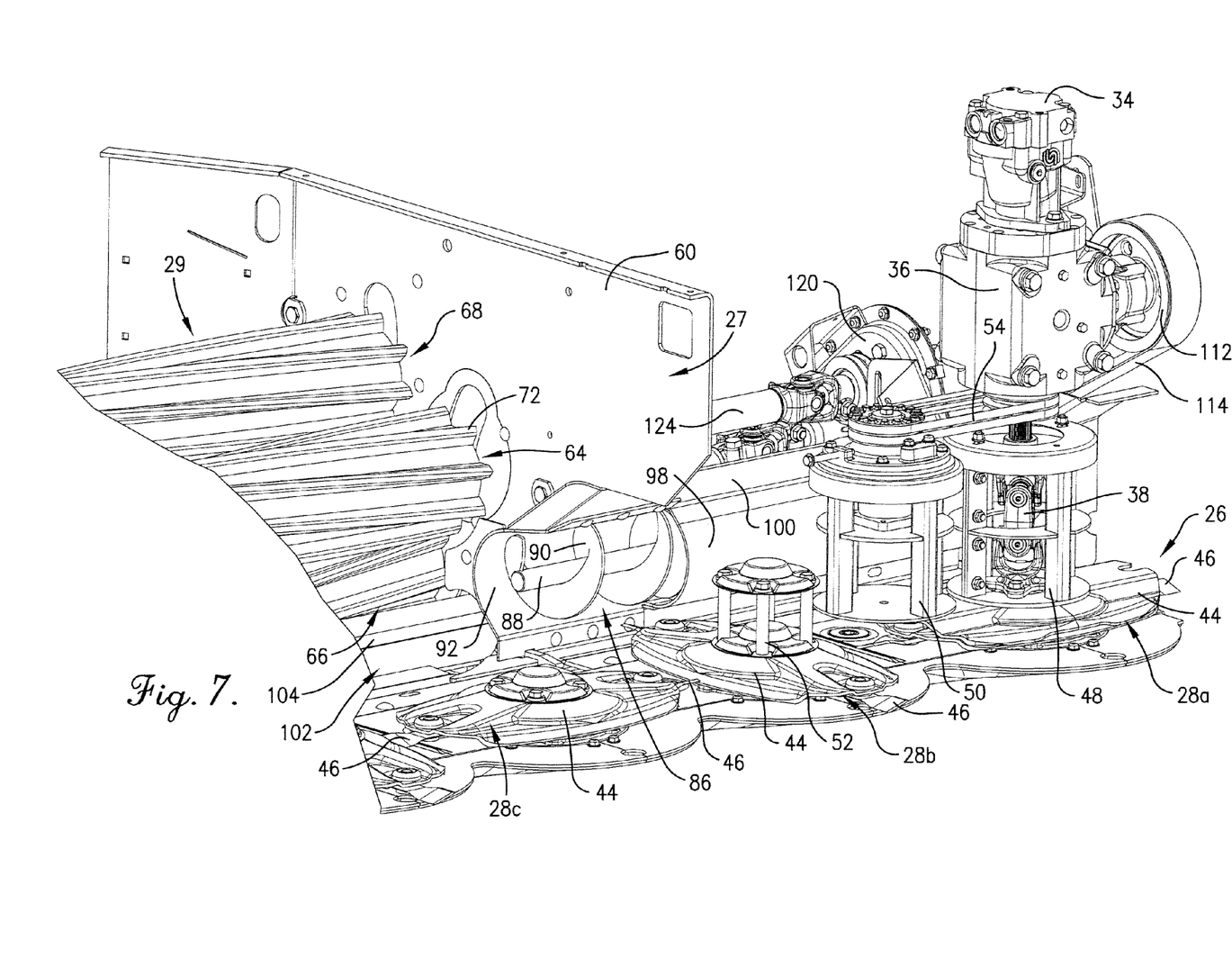
FIG. 7 is a fragmentary, front perspective view of the left end portion of the header with structure removed to reveal details of construction.

As illustrated best in FIGS. 4 and 7, the embodiment of FIGS. 1-7 includes a helper roll 102 that spans opening 27 in front of the lower front quadrant of lower conditioner roll 66. Helper roll 102 is constructed and arranged in accordance with the principles set forth in U.S. Pat. No. 6,158,201 to Pruitt et al. titled "Rotary Mower Conditioner Having Improved Cut Crop Flow" and assigned to the assignee of the present invention. The '201 patent is hereby incorporated by reference into the present specification for a full and complete understanding of the nature and operation of helper roll 102.

It will be noted that helper roll 102 is an upturning roll such that the front extremity thereof is moving upwardly and rearwardly generally toward the nip between front conditioning rolls 64, 66. It is provided with axially extending, radially outwardly projecting, circumferentially spaced lugs 104 on its periphery that engage crop material as it moves rearwardly into opening 27. Helper roll 102 thus assists in delivering such material up into the nip between front conditioning rolls 64, 66.

In the illustrated embodiment, as shown in FIG. 4, the outer diameter of stub auger 84 (and 86) is slightly larger than the diameter of helper roll 102 and more closely approximates the diameter of lower conditioner roll 66 at the base of the ribs 72. As shown in FIG. 4, the axis of rotation 106 of helper roll 102 is located between the axis of rotation 108 of stub augers 84, 86 and the axis of rotation 110 of lower conditioner roll 66 in a fore-and-aft sense. Furthermore, axis 106 of helper roll 102 is located below axes 108 and 110, which are generally at the same level. Stub augers 84, 86 forwardly overlap the cutting plane of knives 46, with the axis 108 of such stub augers being generally directly vertically above knives 46 in their rearmost positions as illustrated in FIG. 4. Although stub augers 84, 86 are spaced above the cutting plane of knives 46, they are located down as close as possible to such plane so as to aid in stripping crop materials from the cutters.

As perhaps shown best in FIGS. 5 and 7, gear box 36 at the left end of header 24 has a horizontal, outwardly extending output to a sheave 112 that is wrapped by a wide, endless belt 114. Belt 114 extends rearwardly from sheave 112 and is wrapped around a rearwardly disposed sheave 116 fixed to an input shaft 118 leading to an upright gear box 120. Gear box 120 has a first generally horizontal driveline 122 leading therefrom and operably coupled with the shaft 76 of lower front conditioner roll 66 for supplying driving power thereto. A second driveline 124 extends inwardly from gear box 120 and is drivingly coupled with shaft 74 of upper front conditioner roll 64 for supplying driving power to that roll. A third driveline 126 extends inwardly from gear box 120 and is drivingly coupled with a shaft 128 of helper roll 102 for supplying driving power to that roll. A double sheave 130 on output driveline 126 is entrained by a double belt 132 leading forwardly to a double sheave 134 on a shaft 136 fixed axially to the auger tube 88 of stub auger 86 for supplying upturning driving power thereto.

Figure 2:
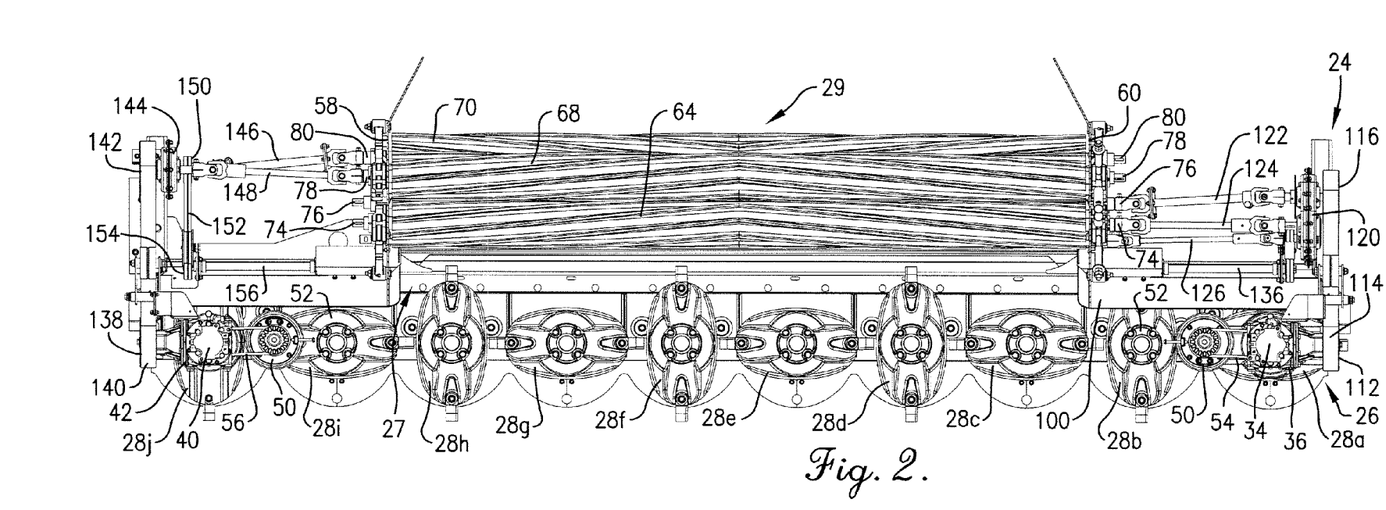
FIG. 2 is a fragmentary top plan view of the header with portions thereof removed to reveal details of construction.
Figure 3:
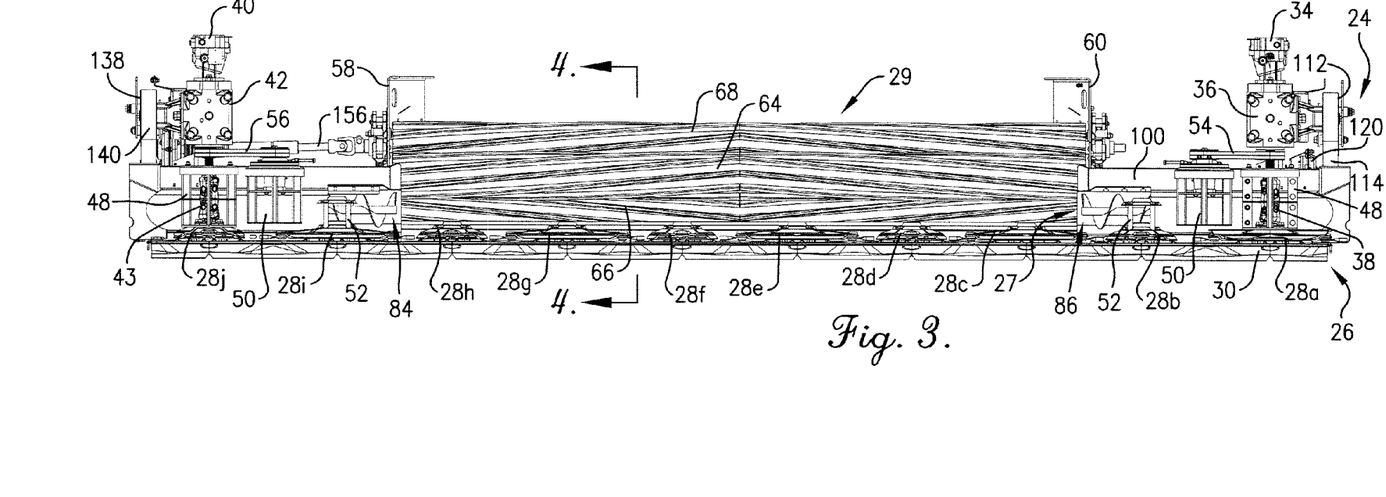
FIG. 3 is a front elevational view of the header with covering portions thereof removed.

With reference to FIG. 2, it will be noted that the right gear box 42 has a horizontally outwardly extending output to a sheave 138 entrained by a wide, endless belt 140. Belt 140 extends rearwardly from sheave 138 and is wrapped around a rear sheave 142 having an output to a gear box 144. Gear box 144, in turn, is operably coupled with a first driveline 146 that is operably coupled at its inboard end with the shaft 80 of lower rear drive roll 70. A second driveline 148 leads inwardly from gear box 144 to an operable coupling with shaft 78 of upper rear conditioner roll 68. A double sheave 150 on first driveline 146 is wrapped by a double belt 152 that leads forwardly to a second double sheave 154 on a transverse shaft 156 drivingly coupled with the auger tube 88 of the right stub auger 84 for supplying upturning driving power thereto.

Although the rotational speed chosen for stub augers 84, 86 can vary over a fairly wide range without departing from the principles of the present invention, one preferred embodiment has stub augers 84, 86, helper roll 102, and conditioner rolls 29 all rotating at generally the same revolutions per minute. As stub augers 84, 86 are slightly larger in diameter than helper roll 102, the peripheral speed of augers 84, 86 is slightly higher than that of helper roll 102. Because stub augers 84, 86 are slightly smaller in diameter than the overall outer diameter of conditioner rolls 29, the peripheral speed of stub augers 84, 86 is slightly less than that of conditioner rolls 29.

Operation

Stub augers 84 and 86 provide extra control and guidance for severed materials at the critical corner regions of the opening 27 where smooth, uninterrupted flow is so necessary yet challenging to achieve. By providing "live", inwardly moving surfaces at those locations via stub augers 84, 86, errant materials that might otherwise be thrown into the space behind outboard cutters 28b and 28i by the two inboard cutters 28c and 28h are effectively intercepted "on the fly" and fed immediately and directly into opening 27. Thus, errant materials have no opportunity to dwell, pause, or collect behind outboard cutters 28b, 28i and adversely affect windrow formation, cut-off, or cause plugging of the machine.

Alternative Embodiment

Figure 8:
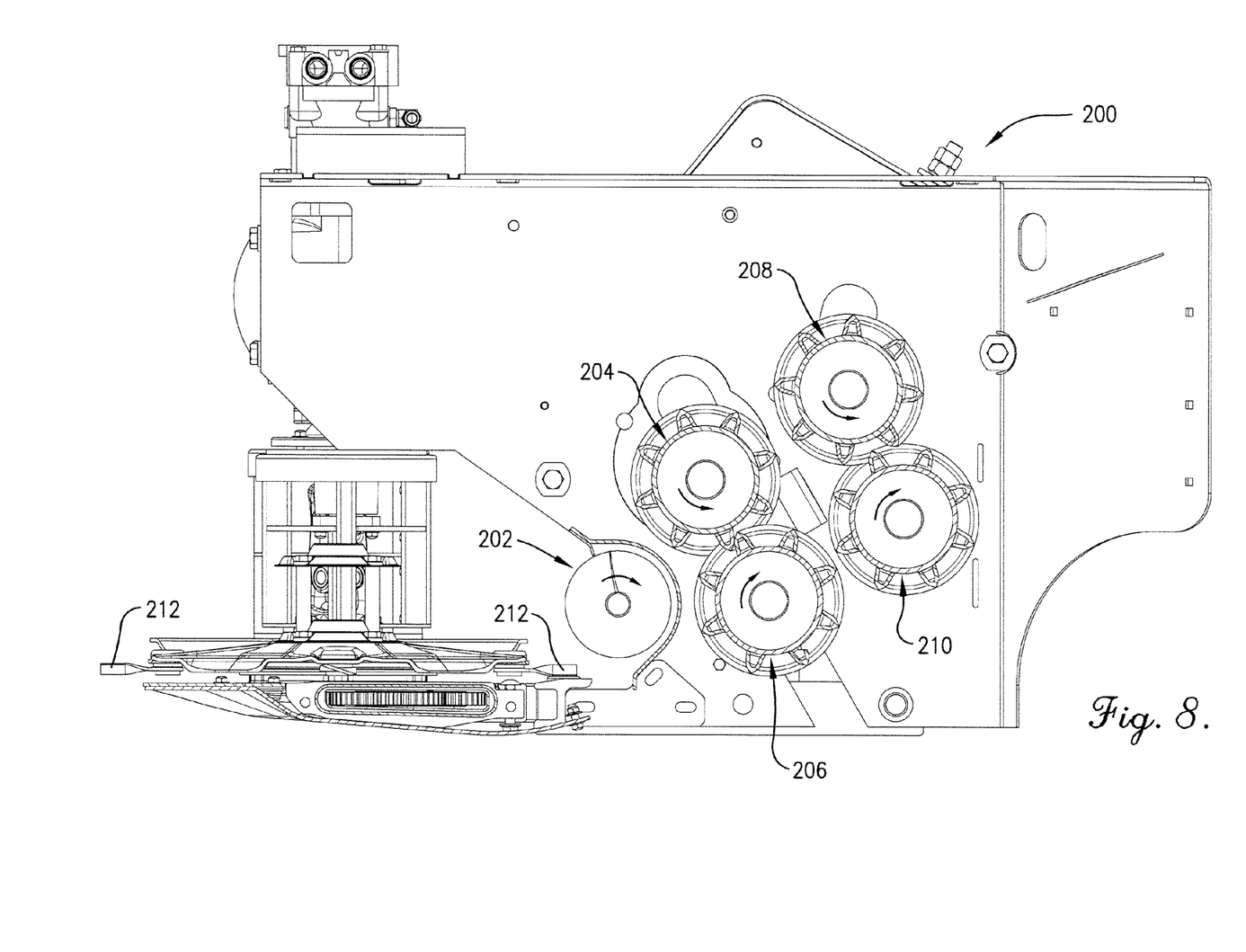
FIG. 8 is a transverse cross-sectional view similar to FIG. 4 of another embodiment of a harvesting machine wherein no helper roll is utilized to aid in delivering severed crop material to the conditioner rolls.

FIG. 8 illustrates an alternative embodiment comprising a header 200 that is virtually identical to header 24 with the exception that header 200 does not utilize a helper roll as in the first embodiment. Thus, in this embodiment, the stub auger 202 is disposed closer in a fore-and-aft sense to the nip between upper front conditioner roll 204 and lower front conditioner roll 206 than stub auger 84 is to the nip of conditioner 64, 66 in the first embodiment. In all other respects, the two embodiments are the same.

It will be appreciated, therefore, that the use of stub augers such as stub auger 202 at the corners of the opening into conditioner rolls on a windrower is beneficial even if a helper roll is not utilized. Additionally, although a rear pair of conditioner rolls 208 and 210 is also shown in FIG. 8, it will be appreciated by those skilled in the art that stub augers such as stub auger 202 are beneficial even if a second, rear pair of conditioner rolls is not utilized. It will be noted also that without the presence a helper roll such as helper roll 102, stub augers such as stub auger 202 can be disposed somewhat lower and closer to the plane of cutting knives 212 than in the first embodiment. This is also beneficial in helping to strip severed materials off the cutters and in presenting them at a more desirable elevation to the nip between conditioner rolls 204, 206.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a wide-cut crop harvester wherein the cutting width of the harvester is wider than conditioning structure on a pair of crop conditioner rolls such that crop materials cut outboard of the conditioning structure must be moved laterally inwardly before moving rearwardly to the conditioning structure, the improvement comprising:
 - a rotary cutter bed extending across the front of the harvester and having a series of rotary cutters rotatable about individual, upright axes,
 - said series of cutters including a group of inboard cutters each having an axis of rotation located inboard of the opposite ends of said conditioning structure and at least one outboard cutter located outboard of each end of the group of inboard cutters,
 - said outboard cutters having axes of rotation located outboard of the opposite ends of said conditioning structure,
 - each of the first and last inboard cutters in the group and the next adjacent one outboard cutter rotating in mutually opposite directions,
 - the first and last inboard cutters in the group each having a cutting blade that projects laterally outwardly beyond the corresponding end of said conditioning structure as the cutting blade sweeps rearwardly; and
 - a pair of axially spaced apart, transversely extending, rotatable augers behind the cutter bed and forward of the conditioner rolls,
 - each of said augers having a portion thereof located behind and between the axes of rotation of the corresponding one outboard cutter and the next adjacent inboard cutter.

2. In a wide-cut harvester as claimed in claim 1,
 the blades on the first and last inboard cutters in the group being disposed to project laterally outwardly beyond the inboard ends of their corresponding augers as the cutting blades move rearwardly in their paths of travel.

3. In a wide-cut crop harvester as claimed in claim 1,
 said conditioning structure on the conditioner rolls comprising generally helically extending ribs on the rolls.

4. In a wide-cut crop harvester as claimed in claim 1,
 each of said augers having an inboard end that is disposed inboard of the corresponding outboard end of said conditioning structure.

5. In a wide-cut crop harvester as claimed in claim 1,
 said series of cutters including a second outboard cutter outboard of each of said one outboard cutter and rotatable in the same direction as the next adjacent one outboard cutter,
 said second outboard cutters each having an axis of rotation disposed outboard of the axis of rotation of the next adjacent one outboard cutter,
 each of said augers having an outboard end located between the axes of the corresponding pair of outboard cutters.

6. In a wide-cut crop harvester as claimed in claim 1,
 further comprising a helper roll located in front of said conditioner rolls for assisting in directing crop materials into the conditioner rolls,
 said augers being disposed forwardly of said helper roll.

7. In a wide-cut crop harvester as claimed in claim 6,
 said augers being disposed higher than said helper roll and generally at the same height as a lower one of the conditioner rolls.

8. In a wide-cut crop harvester as claimed in claim 1,
 each of said augers being disposed above the cutting plane of the cutters and having a forward extremity overlapping the cutters.

9. In a wide-cut crop harvester as claimed in claim 1,
 said conditioner rolls being devoid of a helper roll in front of the conditioner rolls.

\* \* \* \* \*